(12) United States Patent
Rao et al.

(10) Patent No.: US 12,711,290 B2
(45) Date of Patent: Aug. 18, 2026

(54) MACHINE LEARNING MODEL BASED CONTROLLER FOR RAPID THERMAL PROCESSING CHAMBER

(71) Applicant: Applied Materials, Inc., Santa Clara, CA (US)

(72) Inventors: Preetham Rao, Morgan Hill, CA (US); Raechel Tan, Santa Clara, CA (US); Ananda Sankar Kundu, Kolkata (IN); Wolfgang Aderhold, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1105 days.

(21) Appl. No.: 17/723,285

(22) Filed: Apr. 18, 2022

(65) Prior Publication Data

US 2023/0334201 A1 Oct. 19, 2023

(51) Int. Cl.
*G06F 30/27* (2020.01)
*G05B 17/02* (2006.01)
(Continued)

(52) U.S. Cl.
CPC ............. *G06F 30/27* (2020.01); *G05B 17/02* (2013.01); *G06F 30/18* (2020.01); *G06F 2119/08* (2020.01)

(58) Field of Classification Search
CPC ...... G06F 30/27; G06F 30/18; G06F 2119/08; G05B 17/02
See application file for complete search history.

(56) References Cited

U.S. PATENT DOCUMENTS 5,790,750 A * 8/1998 Anderson ........... H10P 72/0602 219/390
7,112,763 B2 * 9/2006 Hunter ............. H01L 21/67115 219/390

(Continued)

FOREIGN PATENT DOCUMENTS

CN 113392593 A 9/2021
JP 2000188261 A 7/2000

(Continued)

OTHER PUBLICATIONS

P. P. Rao, System Identification and Prediction in Radiative Heat Transfer Using Dynamic Mode Decomposition, pp. 688-700, 2021. (Year: 2021).*
International Search Report and Written Opinion from PCT/US2023/014964 mailed Jun. 15, 2023, 11 pgs.

(Continued)

*Primary Examiner* — Kibrom K Gebresilassie
(74) *Attorney, Agent, or Firm* — Schwabe, Williamson & Wyatt, P.C.

(57) ABSTRACT

Embodiments disclosed herein include a method of developing a reduced order model (ROM) for a model based controller. In an embodiment, the method comprises obtaining a design of a plant, and building a detailed model of the thermal network of the plant from the design of the plant. In an embodiment, the method further comprises obtaining a training input recipe, and running the detailed model using the training input recipe. In an embodiment, the method further comprises generating a plurality of snapshots, wherein each snapshot includes the temperatures of a plurality of components in the detailed model, and utilizing a dynamic mode decomposition with control (DMDc) operation in order to extract the ROM from the plurality of snapshots.

18 Claims, 7 Drawing Sheets

(51) Int. Cl.
*G06F 30/18* (2020.01)
*G06F 119/08* (2020.01)

(56) References Cited

U.S. PATENT DOCUMENTS

| | | | | |
|---|---|---|---|---|
| 2008/0170842 | A1 | 7/2008 | Hunter et al. | |
| 2009/0178751 | A1 * | 7/2009 | Presley | H01L 21/67225 156/60 |
| 2022/0136772 | A1 * | 5/2022 | Aderhold | F27B 17/0025 438/5 |
| 2022/0316736 | A1 * | 10/2022 | Nabi | G06F 17/13 |

FOREIGN PATENT DOCUMENTS

| | | | |
|---|---|---|---|
| JP | 2017502529 | A | 1/2017 |
| JP | 2017532688 | A | 11/2017 |
| TW | 200606623 | A | 2/2006 |
| WO | 2019113103 | A1 | 6/2019 |

OTHER PUBLICATIONS

Nemwel K. Ariaga et al, "Thermal modelling using dynamic mode decomposition for thermal error compensation in the temperature domain," Special Interest Group Meeting on Thermal Issues Laboratory for Machine Tools and Production Engineering (WZL) of RWTH Aachen, Feb. 27, 2020, retrieved from <https://www.euspen.eu/knowledge-base/T120123.pdf>, 4 pgs.

Christophe Patyn et al., "Dynamic mode decomposition for nonintrusive and robust model predictive control of residential heating systems," Energy & Buildings, vol. 254, No. 111450, Jan. 1, 2022, retrieved from <https://scientificdirect.com/science/article/pil/S0378778821007349>, 7 pgs.

International Preliminary Report on Patentability from PCT Application No. PCT/US2023/014964, dated Oct. 31, 2024, 7 pages.

Official Letter from Taiwan Patent Application No. 112112217 dated Aug. 18, 2025, 11 pgs.

Notice of Reasons for Rejcection from Japanese Patent Application No. 2024-560751 dated Jan. 20, 2026, 7 pgs.

* cited by examiner

MACHINE LEARNING MODEL BASED CONTROLLER FOR RAPID THERMAL PROCESSING CHAMBER

BACKGROUND

1) Field

Embodiments relate to the field of semiconductor manufacturing and, in particular, to a model based controller that uses dynamic mode decomposition with control (DMDc) in order to generate a reduced order model (ROM).

2) Description of Related Art

Controllers are used to adjust measured parameters within semiconductor processing tools. For example, a controller may be used to adjust the temperature of a substrate in a rapid thermal processing (RTP) tool. Generally, some controller architectures, such as PID controllers, are not well suited for multi-input-multi-output MIMO systems. RTP tools are one example of such an MIMO system. Accordingly, control of such systems have relied on what are generally classified as model based controllers. In a model based controller, a model of the system that accounts for the underlying governing dynamics of the system is developed. At a first level, the model based controller may utilize detailed models of the system. However, such detailed models are often complex and require too much computing power to run as a suitable real time controller. Additionally, such models may require frequent modification due to different sources of parameter variations, manufacturing and assembly differences, and operational uncertainties and errors. As such, so called reduced order models (ROMs) are generated from the detailed model.

In some instances, the ROMs are extracted from a solver, such as a detailed model. However, it is to be appreciated that not all interested parties have access to the solver. For example, the solver may be proprietary to the company selling the controller system. Accordingly, non-intrusive ROM generation methods have been proposed.

SUMMARY

Embodiments disclosed herein include a method of developing a reduced order model (ROM) for a model based controller. In an embodiment, the method comprises obtaining a design of a plant, and building a detailed model of the thermal network of the plant from the design of the plant. In an embodiment, the method further comprises obtaining a training input recipe, and running the detailed model using the training input recipe. In an embodiment, the method further comprises generating a plurality of snapshots, wherein each snapshot includes the temperatures of a plurality of components in the detailed model, and utilizing a dynamic mode decomposition with control (DMDc) operation in order to extract the ROM from the plurality of snapshots.

Embodiments may further comprise a processing tool. In an embodiment, the processing tool comprises a chamber, a plurality of lamps at a lid of the chamber, a reflector along a bottom of the chamber, and a substrate support to hold a substrate between the plurality of lamps and the reflector. In an embodiment, the processing tool further comprises a controller coupled to the chamber for controlling a temperature of the substrate, wherein the controller is a model based controller that utilizes a reduced order model (ROM) generated with a dynamic mode decomposition with control (DMDc) process.

Embodiments may further comprise a method of developing a reduced order model (ROM) for a model based controller. In an embodiment, the method comprises generating a plurality of snapshots, wherein each snapshot includes the temperatures of a plurality of components in a processing tool, and utilizing a dynamic mode decomposition with control (DMDc) operation in order to extract the ROM from the plurality of snapshots.

DETAILED DESCRIPTION

Systems described herein include a model based controller that uses dynamic mode decomposition with control (DMDc) in order to generate a reduced order model (ROM). In the following description, numerous specific details are set forth in order to provide a thorough understanding of embodiments. It will be apparent to one skilled in the art that embodiments may be practiced without these specific details. In other instances, well-known aspects are not described in detail in order to not unnecessarily obscure embodiments. Furthermore, it is to be understood that the various embodiments shown in the accompanying drawings are illustrative representations and are not necessarily drawn to scale.

As noted above, model based controllers are typically used for controlling multi-input-multi-output (MIMO) processes. One such MIMO process is the control of a substrate temperature in a rapid thermal processing (RTP) tool. In such tools, a plurality of lamps are provided. In some instances, the lamps may be organized into two or more zones (e.g., an inner zone, a middle zone, and an outer zone) on a lid of a chamber. A reflector plate may be provided on a bottom surface of the chamber. A substrate may be positioned between the lamps and the reflector plate. In such architectures, the control of the different zones are the multiple inputs, and temperatures of the substrate at various locations may be the multiple outputs.

Figure 1:
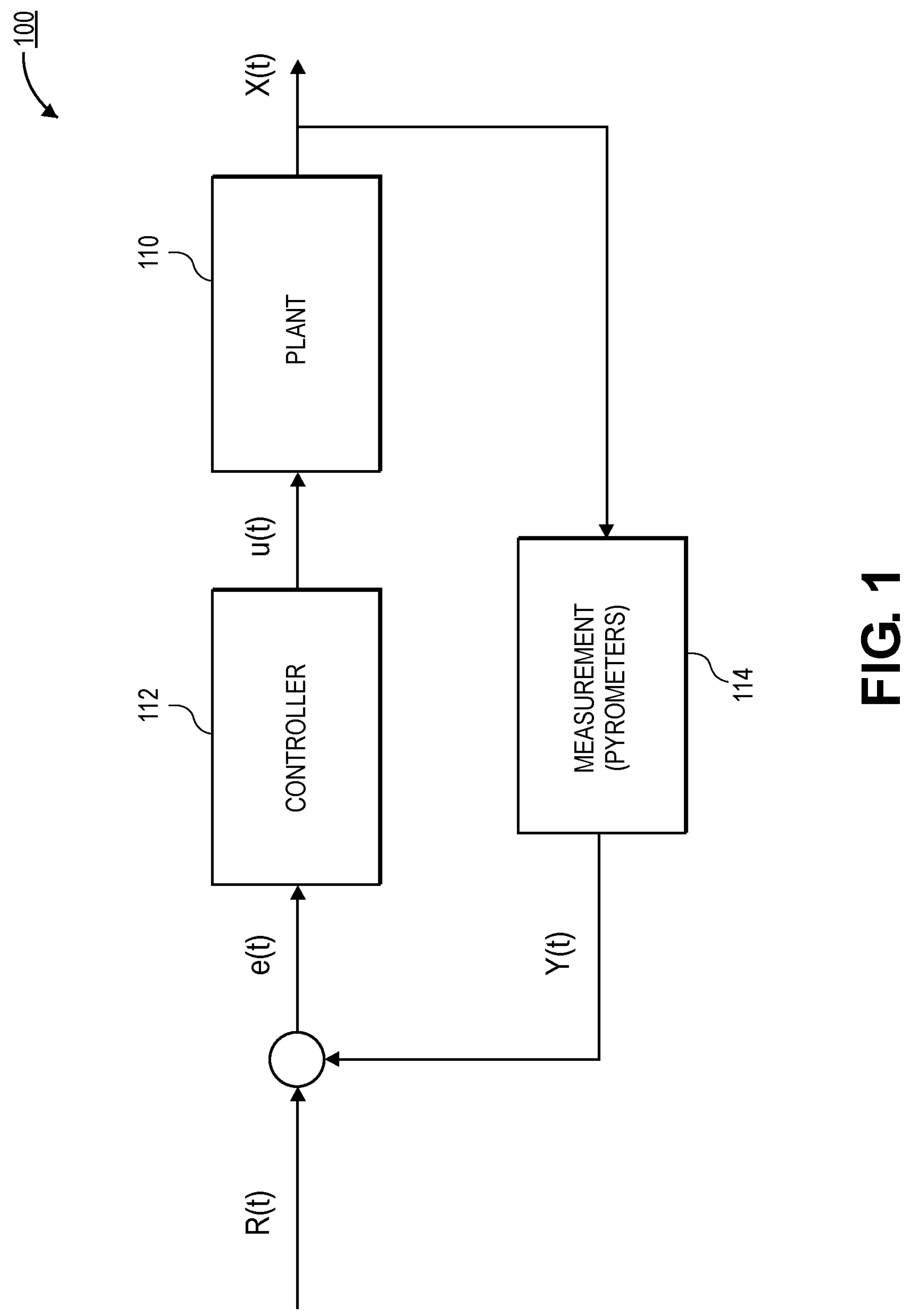
FIG. 1 is a schematic illustration of a system with a model based controller, in accordance with an embodiment.

A general illustration of a control system 100 for a plant 110 is show in FIG. 1. In FIG. 1, the plant 110 may be a RTP tool. However, it is to be appreciated that the plant 110 may be any MIMO type tool. For example, furnaces, ovens, thermo-chemical plants, and the like may be used as the plant 110. In an embodiment, a control effort input u(t) (e.g., lamp power) is generated by the controller 112 and supplied to the plant 110. States X (t) are the states (i.e., temperatures) of the components of the plant. A measurement tool 114 (e.g., one or more pyrometers) measures a temperature Y(t) of one or more components of the plant 110. The measured temperature Y(t) is compared to a setpoint temperature R(t) to provide an error signal e(t) that is fed back into the controller 112.

In a particular embodiment, the controller 112 is a model based controller (MBC). In an embodiment, the MBC uses a model, which is a relation between the control effort u(t) and the outputs Y(t). Typically, the model is based on the system of equations in Equation 1, where B, D, and P are matrices that are used to model the system.

$$\dot{x}=Bx+Du$$

$$y=Px \qquad \text{Equation 1}$$

However, in radiation dominated systems (such as an RTP tool), a non-linear system of equations may be more suitable. For example, the governing equations in radiation dominated heat transfer typically contain linear (i.e., conduction and convection) and quartic (i.e., radiation) terms of temperature. As such, an $x^4$ term may be included in the system of equations. For example, Equation 2 is an example of such an embodiment, where A, B, D, and P are matrices, and c is a constant.

$$\dot{x}=Ax^4+Bx+c+Du$$

$$y=Px \qquad \text{Equation 2}$$

Due to the complexity of a MIMO system such as an RTP tool, and the broad range of temperatures of the substrate (e.g., 400° C. to 1,100° C.), it is hard to obtain a model such as the above equations using traditional system-identification methods. Accordingly, embodiments disclosed herein include the use of dynamic mode decomposition with control (DMDc) in order to generate the unknown matrices in order to run the model. In some embodiments, the DMDc method generates a linear system of equations (similar to Equation 1), and in other embodiments, the DMDc method generates a non-linear system of equations (similar to Equation 2).

For reference, the DMDc method begins after the collection of dynamical data from either experiments or numerical simulations. The system output data is collected as n state values for m+l time steps. The time step is assumed to be a constant. This "snapshot" of data is split into two parts, offset by one time step. A linear relation between the data at time step j, $x_j$, the actuation inputs, $u_j$, and the data at the next time step, $x_{j+1}$ is sought. Equation 3 is as follows:

$$x_{j+1}\approx Ax_j+Bu_j, \forall j=1 \ldots m \qquad \text{Equation 3}$$

where $x_j$ are column vectors of length n, the number of states, or unknowns, in the system, and $u_j$ are column vectors of length l, the number of inputs or actuations to the system. In a numerical model, n is the number of nodes, or cells, into which the computational domain is partitioned, and the data is stored at. This can range from the order of tens for simple network type models to hundreds of thousands or even millions for two or three-dimensional geometric models. Similarly, for data sets from a numerical model, l is the number of volumetric and external boundary conditions that do not involve the state variable x. For example, in a thermal system, this vector could be time varying heat sources, or boundary heat fluxes, or the external components of convective and radiative heat flux conditions at boundary nodes or the cells of the domain.

Using the DMDc method, one can then obtain a simplified, reduced order representation of the numerical model which can be used for quickly analyzing the temporal evolution of the system, instead of utilizing the possibly large, and time consuming, original numerical model. Assuming that data for m+l time steps, the split snapshot data matrices and the actuation matrix can be arranged as shown in Equation 4.

$$X=\begin{bmatrix} | & | & | \\ x_1 & x_2\ldots & x_m \\ | & | & | \end{bmatrix}, \quad X'=\begin{bmatrix} | & | & | \\ x_2 & x_3\ldots & x_{m+1} \\ | & | & | \end{bmatrix}, \text{ and } \quad Y=\begin{bmatrix} | & | & | \\ u_1 & u_2\ldots & u_m \\ | & | & | \end{bmatrix} \qquad \text{Equation 4}$$

Here, X, X'$\in \mathbb{R}^{n\,x\,m}$ and Y$\in \mathbb{R}^{l\,x\,m}$.. The relation in Equation 3 can then be expressed as:

$$X' \approx [A \quad B]\begin{bmatrix} X \\ Y \end{bmatrix} = [G][\Omega] \qquad \text{Equation 5}$$

Here, G$\in \mathbb{R}^{n\,x\,(n+1)}$ and Ω$\in \mathbb{R}^{(n+1)\,x\,m}$.. Matrix Ω contains both the states and input snapshot information. Next, in order to solve for A and B matrices, a least-square regression using a pseudo-inverse is performed, with the help of singular value decomposition (SVD) of Ω and order reduction. As shown in Equation 6:

$$\Omega=U\Sigma V^*\approx\tilde{U}\tilde{\Sigma}\tilde{V}^* \qquad \text{Equation 6}$$

where U$\in \mathbb{R}^{(n+l)x\,(n+1)}$,, Σ$\in \mathbb{R}^{(n+l)x\,m}$,, V*$\in \mathbb{R}^{m\,x\,m}$,, Ũ$\in \mathbb{R}^{(n+l)x\,q}$,, Z̃$\in \mathbb{R}^{q\,x\,q}$,, and Ṽ*$\in \mathbb{R}^{q\,x\,m}$.. The quantities Ũ, Σ̃, and Ṽ* represent truncated arrays with q singular values to retain only the dominant modes of the system. The following then provides an approximation for G, and subsequently A and B:

$$G = X'\tilde{V}\tilde{\Sigma}^{-1}\tilde{U}^* \qquad \text{Equation 7}$$

$$[A \quad B] \approx [\overline{A} \quad \overline{B}] = \left[X'\tilde{V}\tilde{\Sigma}^{-1}\tilde{U}_1^* \quad X'\tilde{V}\tilde{\Sigma}^{-1}\tilde{U}_2^*\right] \qquad \text{Equation 8}$$

Here, Ũ*$_1\in \mathbb{R}^{n\,x\,q}$ and Ũ*$_2\in \mathbb{R}^{l\,x\,q}$ and $$\tilde{U}^* = \left[\tilde{U}_1^* \quad \tilde{U}_2^*\right]_2.$$

For large systems with over hundreds of thousands of states n, using these approximate A and B matrices in a predictive model in Equation 3 is prohibitive. Hence, $\overline{A}$ and $\overline{B}$ are further reduced in order using a projection for such systems. The projection space is obtained using the SVD of the output space. The eigenvalues and modes of the system are extracted using the order reduced forms of $\overline{A}$ and $\overline{B}$. The dominate modes are typically chosen to retain greater than approximately 95% of the energy in the system. The energy corresponds to the sum of the singular values or the sum of their values squared. After arranging the singular values in descending order, the first q modes are chosen to retain the most energy of the system. Though it is to be appreciated that there are other processes for determining the dominant modes.

In an embodiment, the DMDc method described above can be further modified in order to more accurately model the behavior of systems with non-linear terms. For example, when temperature is the state data variable ($x \equiv T$) the governing equations in radiation dominated heat transfer typically contain linear terms (for conduction and convection), and a quartic term (for radiation) to provide a $T^4$ variable. This is the case in instances when material and thermal properties are constant throughout the computational domain. Correspondingly, an $x^4$ term can be added to the DMDc formulation.

The actuation vector $u_j$, in the context of numerical models, represents the terms in the boundary and volume conditions that do not contain the state data variable T. These terms can represent, for example, constant volumetric heat source terms, or the external domain's conduction or convection energy flux, or radiation energy flux to or from the ambient. Numerical models can have many such boundary conditions, most of which may be constant with time. It is not necessary, and may even be tedious, to enlist and track all such terms into the actuation vector $u_j$.

As such, the vector $u_j$ here was formed from only the temporally varying non-state dependent parts of the volume and boundary conditions in the numerical model. In order to account for the remaining terms of such conditions that are constant in time, a constant term is also added to the DMDc formulation. With the quartic and constant terms, the modified Equation 3 is:

$$x_{j+1} \approx A_1 x_j + \sigma' A_2 x_j^4 + Cg + Bu_j \qquad \text{Equation 9}$$

where σ' is a scaling parameter, based on the Steffan-Boltzman constant of radiation, pre-multiplied in order to have the matrices $A_1$ and $A_2$ similar in numerical magnitude. Vector g is a vector of ones, of size n×l. Matrices $A_1$, $A_2$, $C \in \mathbb{R}^{n\,x\,m}$.. The terms $$A_2 x_k^4$$

and C represent the non-linear and the constant boundary and/or volume condition terms, respectively.

Now, a similar process is followed in order to extract the unknown matrices $A_1$, $A_2$, B, and C.

$$X' \approx [\,A_1 \quad A_2 \quad C \quad B\,]\begin{bmatrix} X \\ X^4 \\ J \\ \Upsilon \end{bmatrix} = [H][\theta] \qquad \text{Equation 10}$$

where, J is a matrix of ones, of size n×m. Let the SVD of $\theta = U\Sigma V^* \approx \tilde{U}\tilde{\Sigma}\tilde{V}^*$, where $U \in \mathbb{R}^{(3n+l)x\,(3n+1)}$,, $\Sigma \in \mathbb{R}^{(3n+l)x\,m}$,, $V^* \in \mathbb{R}^{m\,x\,m}$, $\tilde{U} \in \mathbb{R}^{(3n+l)x\,q}$,, $\tilde{\Sigma} \in \mathbb{R}^{q\,x\,q}$, and $\tilde{V}^* \in \mathbb{R}^{q\,x\,m}$.. Then, $$H = X'\tilde{V}\tilde{\Sigma}^{-1}\tilde{U}^* \qquad \text{Equation 11}$$

and $$[\,A_1 \quad A_2 \quad C \quad B\,] = \left[\,X'\tilde{V}\tilde{\Sigma}^{-1}\tilde{U}_1^* \quad X'\tilde{V}\tilde{\Sigma}^{-1}\tilde{U}_2^* \quad X'\tilde{V}\tilde{\Sigma}^{-1}\tilde{U}_3^* \quad X'\tilde{V}\tilde{\Sigma}^{-1}\tilde{U}_4^*\,\right] \qquad \text{Equation 12}$$

As before, here $$\tilde{U}^* = [\,\tilde{U}_1^* \quad \tilde{U}_2^* \quad \tilde{U}_3^* \quad \tilde{U}_4^*\,]$$

with $$\tilde{U}_1^*, \tilde{U}_2^*, \tilde{U}_3^* \in \mathbb{R}^{n \times q}$$

and $$\tilde{U}_4^* \in \mathbb{R}^{l \times q}.$$

The Modified method can be expected to result in higher accuracy for systems with larger number of states—such systems will have a larger number of boundary and volume conditions. Then, even though the actuation vector consists of only the time-varying heat source or boundary heat flux terms, the other terms in the original system are represented better in the approximate model from DMDc with the constant terms.

It is to be appreciated that the most dominant modes identified in the modified DMDc are still those originating from the linear matrix $A_1$ in Equation 9. Hence, the dominant patterns in the system are still recognized in the same way as they are in the original DMDc method. Additional terms ($A_2$) are augmented to the original DMDc primarily to aid in the conformity of the identified system to the nature of physics that is typically associated with radiative thermal systems. These additional terms can also aid in ensuring the stability of the system, since the eigenvalues of the system in Equation 9 can be conveniently placed in the stable region by tweaking the constant σ'.

Figure 2:
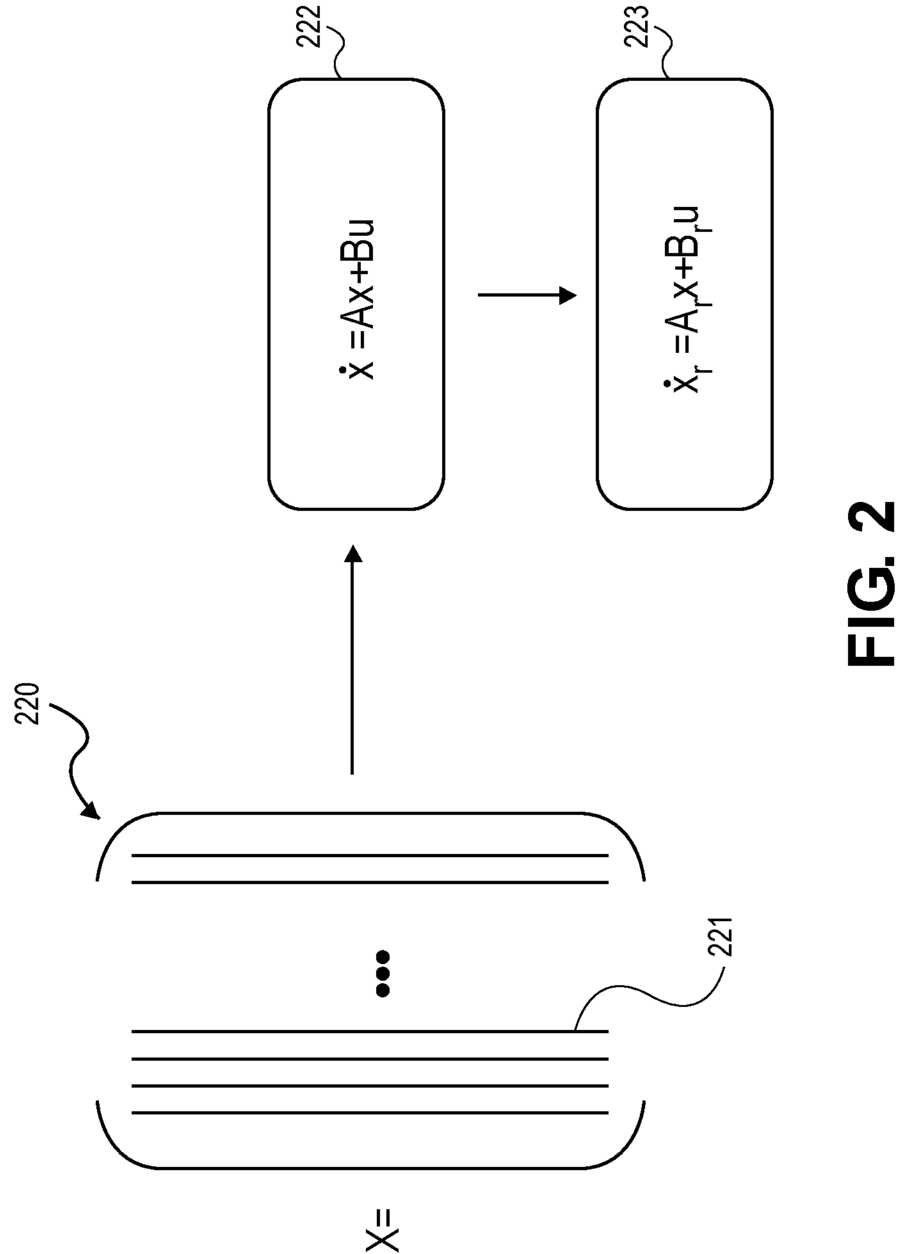
FIG. 2 is an illustration depicting visually the process of using a dynamic mode decomposition with control (DMDc) in order to generate a reduced order model (ROM).

The mathematical processes for extracting a ROM using standard DMDc and DMDc with a polynomial expansion are provided above. Additionally, FIG. 2 is a pictorial representation of how the ROMs can be determined. As shown, X is equal to a matrix 220. The matrix 220 comprises a plurality of snapshots 221. Each snapshot 221 includes the temperature of a plurality of components and the substrate within the RTP tool. The matrix 220 is then used to generate a system identification 222. The system identification 222 may take the form of $\dot{x} = Ax + Bu$. However, it is to be appreciated that a polynomial expansion may also be used in some embodiments. The matrices A and B in the system identification 222 may be similar to the matrix [A B] in Equation 8. That is, in a large system with over hundreds of thousands of states n, using the matrix [A B] may be prohibitive.

Accordingly, the system identification 222 may be further reduced to a ROM 223 with the form $\dot{x}_r = A_r x + B_r u$. In the ROM 223, the $A_r$ matrix and the $B_r$ matrix may be similar to the matrix $[\bar{A}\ \bar{B}]$ described in Equation 8. $A_r$ and $B_r$ are reduced in order using a projection. The projection space is obtained using the SVD of the output space, as described in greater detail above.

While FIG. 2 illustrates the extraction of matrices into a ROM state, it is to be appreciated that in some embodiments the system identification 222 may be sufficiently reduced in complexity in order to be used as the model for the model based controller. For example, when the complexity of the system that is being modeled is reduced, it may not be necessary to further reduce the matrices to a full ROM as shown in FIG. 2.

Additionally, while the ROM is shown in the format of $\dot{x}_r = A_r x + B_r u$, it is to be appreciated that other embodiments may include a ROM with a polynomial format such as, $\dot{x}_r = Ax^4 + B_x + C + Du$. The polynomial format of the ROM may be beneficial in radiation dominated processes that include a $T^4$ term in the underlying governing equations of the system. The formation of a polynomial ROM may be made using DMDc methods similar to those illustrated in detail with respect to Equations 9-12 described in greater detail above.

Figure 3:
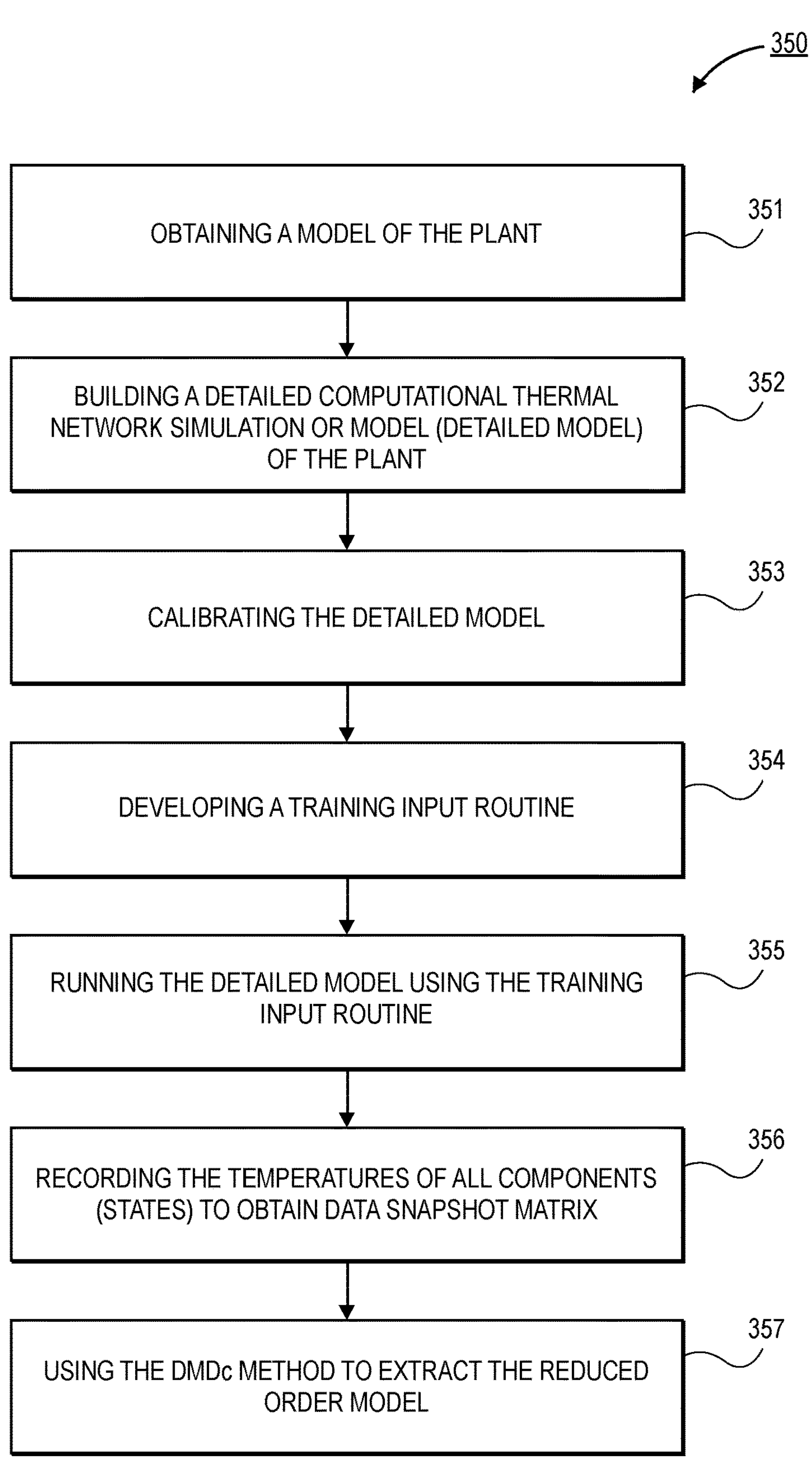
FIG. 3 is a process flow diagram depicting operations used to generate a ROM using DMDc, in accordance with an embodiment.

Referring now to FIG. 3, a process flow diagram depicting a method 350 for forming a ROM is shown, in accordance with an embodiment. The illustrated process involves the formation of a ROM using a numerical model. That is, the plurality of snapshots are captured using a thermal simulation of the plant (e.g., a RTP tool). However, it is to be appreciated that the ROM may also be developed using experimental data that provides a plurality of snapshots as well.

In an embodiment, the method 350 may begin with operation 351, which comprises obtaining a model of the plant. In an embodiment, the model of the plant may be a computer aided design (CAD) file that includes each of the components of the plant. The CAD file may be generated before the plant is actually built. That is, there is no need to have a functional plant before the method 350 is performed. As such, it is easier to modify components in order to provide improved thermal control of the system. In an embodiment, the plant may be a RTP tool. Though it is to be appreciated that any thermal system may be modeled as the plant in other embodiments. For example, the plant may further comprise an oven, a furnace, a thermo-chemical plant, or the like.

In an embodiment, the method 350 may continue with operation 352, which comprises building a detailed computational thermal network simulation or model (i.e., a detailed model) of the plant. The detailed model may include a plurality of nodes that interact with each other thermally (e.g., through conduction, convection, and/or radiation). An example of a detailed model is shown in FIG. 4A.

Figure 4A:
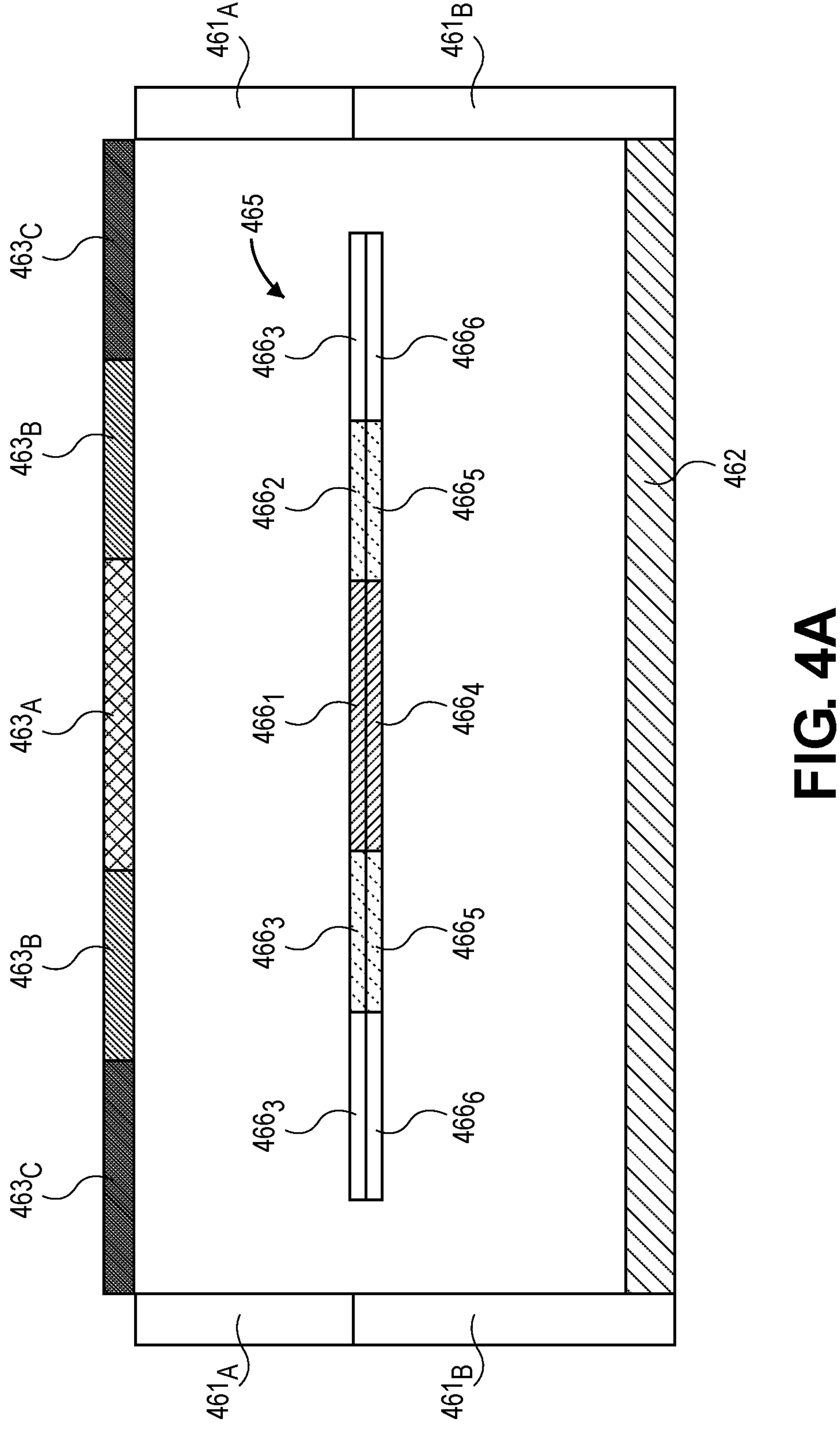
FIG. 4A is a schematic of a rapid thermal processing (RTP) tool that has been segmented into individual components in order to form a detailed model of the system, in accordance with an embodiment.

As shown, in FIG. 4A, the plant 460 comprises chamber sidewalls 461A and 461B. The sidewalls 461A and 461B are modeled as discrete nodes, but it is to be appreciated that the sidewalls 461 of the chamber may be a single material. A reflector plate 462 is provided at the bottom of plant 460. At the top of the plant 460 is a plurality of heater zones 463A-C. The heater zones may be circular annular plates. Each heater zone 463 may comprise one or more lamps that are configured to heat a substrate 465.

The substrate 465 may be positioned between the heater zones 463A-C and the reflector plate 462. In the illustrated embodiment, the substrate 465 is shown as floating for simplicity. However, it is to be appreciated that a substrate support (not shown) may be provided below the substrate 465. In the illustrated embodiment, the substrate 465 is only heated by radiation since there is no contact with other components of the plant 460. However, in practice a conduction term may also be included to account for the underlying support contacting the substrate 465. In the illustrated embodiment, the substrate 465 is broken into a plurality of nodes $\mathbf{466}_{1\text{-}n}$. For example six nodes $\mathbf{466}_{1\text{-}6}$ are shown in FIG. 4A. Three nodes 46613 are on the top surface of the substrate 465 and three nodes $\mathbf{466}_{4\text{-}6}$ are on the bottom surface of the substrate 465. Accordingly, a total of twelve nodes are shown in FIG. 4A (i.e., six nodes for the substrate 465, three nodes for the heater zones, a node for the reflector, and two nodes for the sidewalls).

The equations for heat transfer between the components may be derived using a surface to surface radiation method. Theoretical formulations for radiation view factors between circular disc, annular rings, and cylindrical surfaces may be used to model the thermal response of the plant 460. Furthermore, it is to be appreciated that the thermal model illustrated in FIG. 4A is highly simplified for purposes of illustration. In reality, the CAD file may provide enough detail in order to generate hundreds of nodes or even thousands of nodes. It is to be appreciated that increasing the number of nodes does not negatively affect the model based controller, since the detailed model is reduced to a ROM using the DMDc methods described in greater detail above.

Referring back to FIG. 3, the method 350 may continue with operation 353, which comprises calibrating the detailed model. The detailed model may be calibrated by comparing the outputs of the numerical detailed model with actual experimental data obtained during the use of the plant 460. However, in some embodiments, the plant 460 may not be available (e.g., the plant 460 may not be assembled). In such embodiments, the detailed model may be used without calibration.

Figure 4B:
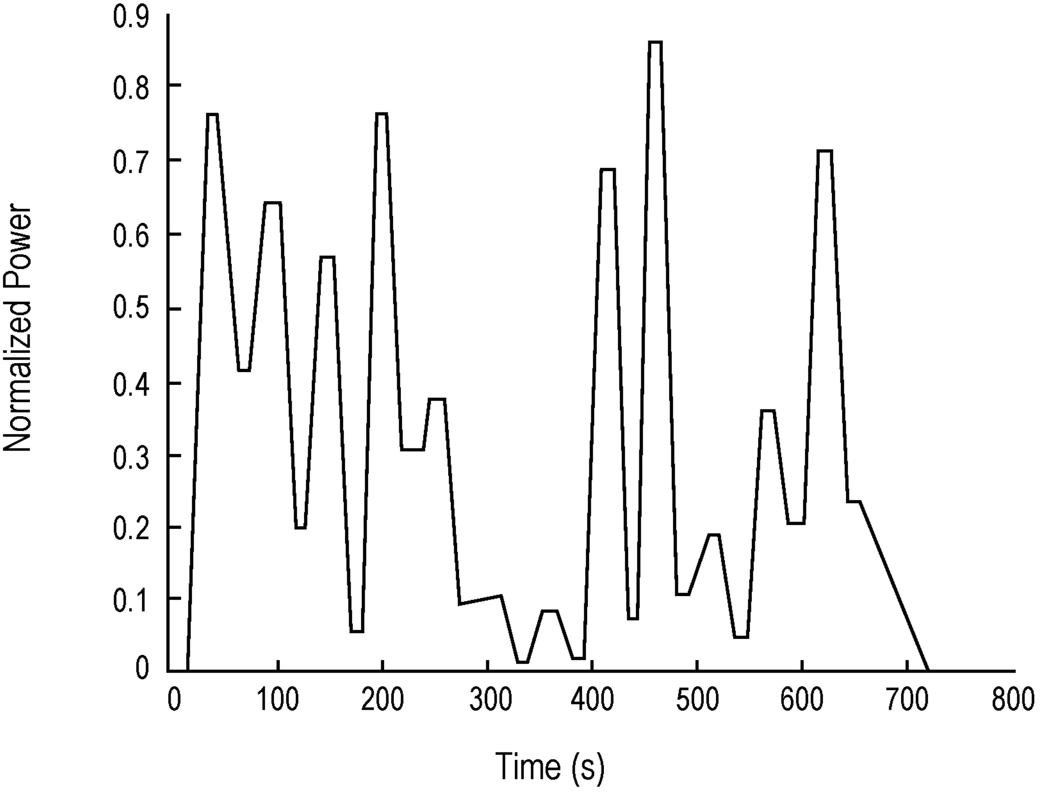
FIG. 4B is a training input recipe that is a graph of normalized power provided to one of the heating zones of an RTP tool, in accordance with an embodiment.

In an embodiment, the method 350 may then continue with operation 354, which comprises developing a training input routine. The training input routine may include a recipe that includes various ramp ups, dwell times, and ramp downs. FIG. 4B is a graph of the normalized power to one of the heater zones of the plant 460. As shown, a random assortment of ramp-up rates, dwell times, and ramp-down rates were provided in the training input routine. A single heater zone is shown in FIG. 4B. But, it is to be appreciated that the training input routine may also include randomized power inputs for the other heater zones. For example, individual ones of the heater zones may have different routines. While the ramp-ups, ramp-downs, and dwell times are randomized, it is to be appreciated that the different peaks should roughly capture expected ramp-rates, dwell times, and the like that will actually be implemented in the processing of substrates in the plant 460.

Referring back to FIG. 3, the method 350 continues with operation 355, which comprises running the detailed model using the training input routine. That is, the detailed model is executed with the power inputs of the training input routine. Due to the potential complexity of the detailed model, the real time required to execute the training input routine may be greater than the duration of the training input routine. That is, the detailed model may not be capable of real time analysis of the plant. As such, a ROM is needed in order to properly function as a model based controller.

Figure 4C:
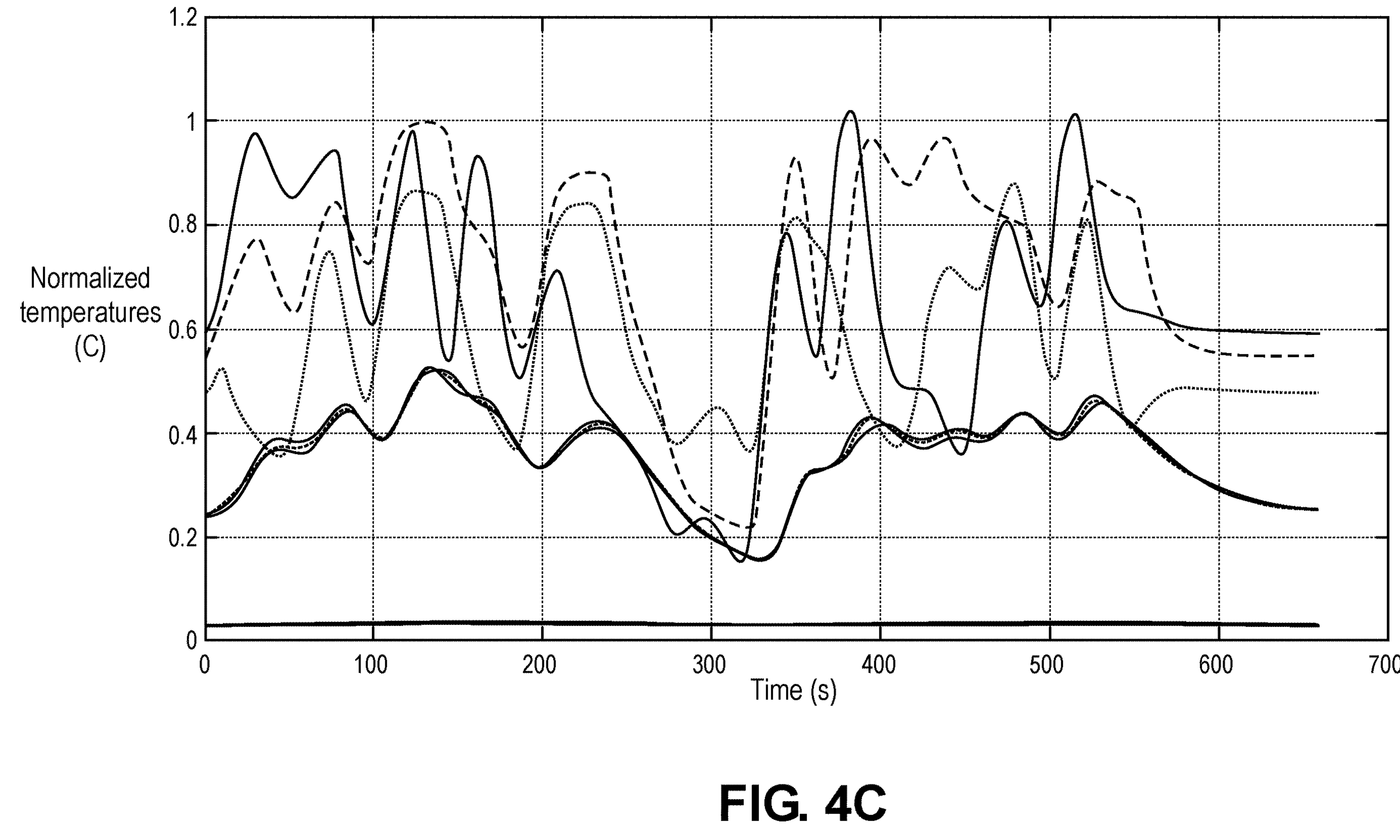
FIG. 4C is a graph of the normalized temperature of various components in the RTP tool that is used to generate a plurality of snapshots used to implement the DMDc process, in accordance with an embodiment.

In an embodiment, method 350 may continue with operation 356, which comprises recording the temperatures of all components (states) to obtain a data snapshot matrix. For example, the detailed model is able to output a plurality of snapshots at uniform time intervals. For example, each snapshot may be provided at one second or shorter time intervals. In some embodiments, the time interval may be a tenth of a second or less. Each snapshot includes the temperature data of each of the nodes in the detailed model. For example, in FIG. 4C the normalized temperature of a plurality of nodes are shown over a period of time. While depicted graphically in FIG. 4C for ease of understanding, it is to be appreciated that the snapshots may be expressed in matrix form with the number of rows equal to the number of nodes, and the number of columns equal to the number of snapshots.

Referring back to FIG. 3, the method 350 continues with operation 357 which comprises using the DMDc method to extract the ROM. In some embodiments, the DMDc method may be a linear model, similar to the equation shown in Equation 3. In other embodiments, the DMDc method may be the modified method that includes a polynomial term, such as the equation shown in Equation 9. The DMDc method may be implemented in accordance with any of the embodiments described in greater detail above. Generally, the process follows the flow shown in FIG. 2. That is, the snapshot matrix 220 may be obtained and a system identification 222 is extracted from the snapshot matrix 220. In instances where the system identification 222 is too complex to run as part of the model based controller, the ROM 223 is extracted from the system identification 222.

The extracted ROM may then be used in a model based controller, such as the model based controller depicted in FIG. 1. That is, the error signal e(t) can be fed into the controller 112. The controller 112 can then use the ROM to generate a control signal u(t) that is delivered to the plant 110 in order to converge the measured temperature values Y(t) to the setpoint temperature R(t).

Applicants have developed ROMs in accordance with embodiments described in greater detail above. Particularly, it has been shown that such ROMs have a high degree of uniformity with the numerical detailed models. For example, several different recipes (e.g., with different initial conditions and actuation inputs) were run with the detailed model. The outputs of the detailed model closely matched the outputs provided by ROMs similar to those described in greater detail herein. In some instances the margin of error between the detailed model output and the ROM output was within 10%. However, in many instances, the margin of error between the detailed model output and the ROM output was within 5%. Furthermore, when the number of boundary and volume conditions in the model are larger, the constant term in Equation 9 is expected to further increase the accuracy of the predictions.

Figure 5:
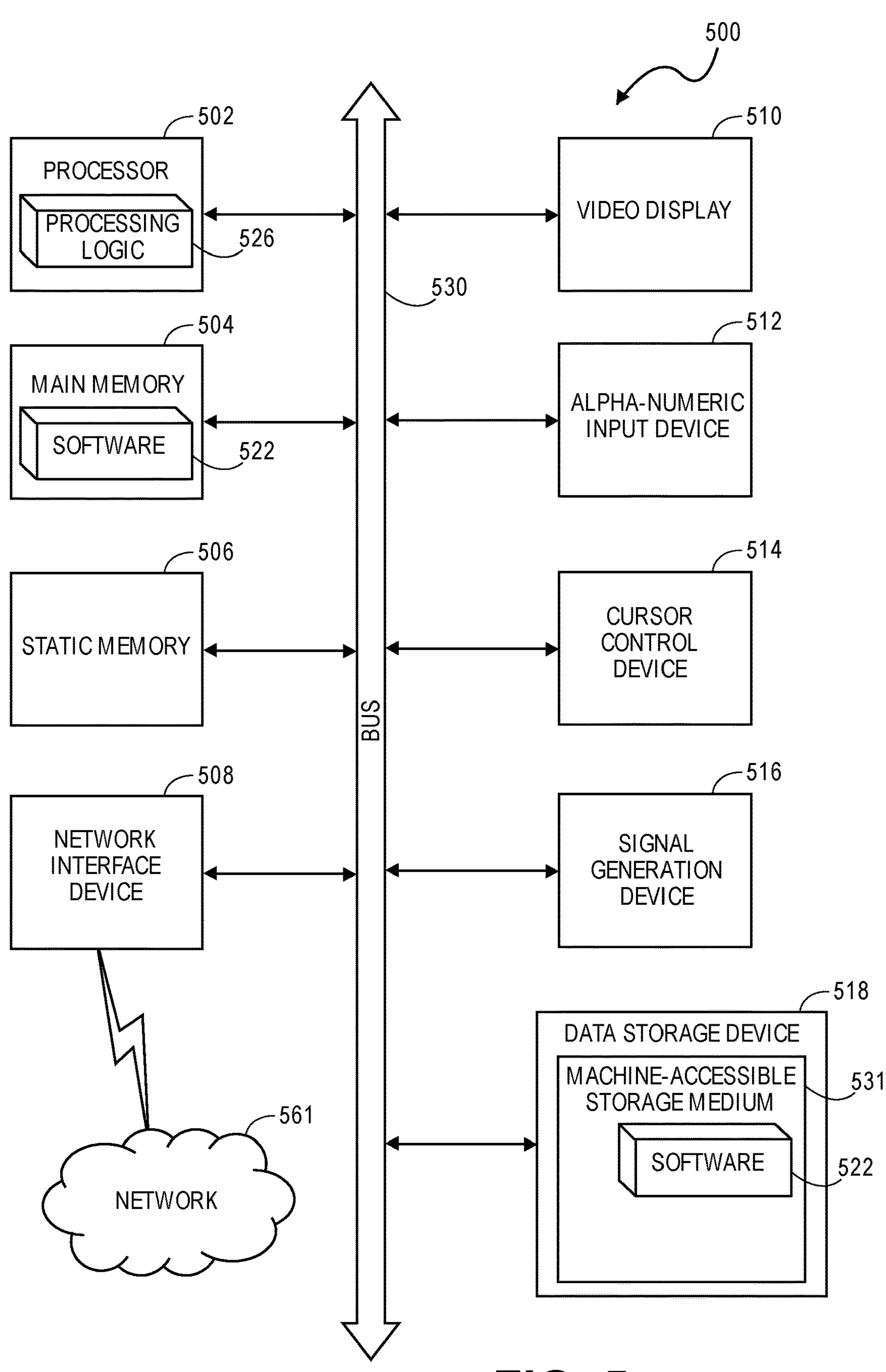
FIG. 5 illustrates a block diagram of an exemplary computer system that may be used in conjunction with a processing tool, in accordance with an embodiment.

Referring now to FIG. 5, a block diagram of an exemplary computer system 500 of a processing tool is illustrated in accordance with an embodiment. In an embodiment, computer system 500 is coupled to and controls processing in the processing tool. Computer system 500 may be connected (e.g., networked) to other machines in a Local Area Network (LAN), an intranet, an extranet, or the Internet. Computer system 500 may operate in the capacity of a server or a client machine in a client-server network environment, or as a peer machine in a peer-to-peer (or distributed) network environment. Computer system 500 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for computer system 500, the term "machine" shall also be taken to include any collection of machines (e.g., computers) that individually or jointly execute a set (or multiple sets) of instructions to perform any one or more of the methodologies described herein.

Computer system 500 may include a computer program product, or software 522, having a non-transitory machine-readable medium having stored thereon instructions, which may be used to program computer system 500 (or other electronic devices) to perform a process according to embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

In an embodiment, computer system 500 includes a system processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

System processor 502 represents one or more general-purpose processing devices such as a microsystem processor, central processing unit, or the like. More particularly, the system processor may be a complex instruction set computing (CISC) microsystem processor, reduced instruction set computing (RISC) microsystem processor, very long instruction word (VLIW) microsystem processor, a system processor implementing other instruction sets, or system processors implementing a combination of instruction sets. System processor 502 may also be one or more special-purpose processing devices such as an application specific integrated circuit (ASIC), a field programmable gate array (FPGA), a digital signal system processor (DSP), network system processor, or the like. System processor 502 is configured to execute the processing logic 526 for performing the operations described herein.

The computer system 500 may further include a system network interface device 508 for communicating with other devices or machines. The computer system 500 may also include a video display unit 510 (e.g., a liquid crystal display (LCD), a light emitting diode display (LED), or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-accessible storage medium 532 (or more specifically a computer-readable storage medium) on which is stored one or more sets of instructions (e.g., software 522) embodying any one or more of the methodologies or functions described herein. The software 522 may also reside, completely or at least partially, within the main memory 504 and/or within the system processor 502 during execution thereof by the computer system 500, the main memory 504 and the system processor 502 also constituting machine-readable storage media. The software 522 may further be transmitted or received over a network 520 via the system network interface device 508. In an embodiment, the network interface device 508 may operate using RF coupling, optical coupling, acoustic coupling, or inductive coupling.

While the machine-accessible storage medium 532 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies. The term "machine-readable storage medium" shall accordingly be taken to include, but not be limited to, solid-state memories, and optical and magnetic media.

In the foregoing specification, specific exemplary embodiments have been described. It will be evident that various modifications may be made thereto without departing from the scope of the following claims. The specification and drawings are, accordingly, to be regarded in an illustrative sense rather than a restrictive sense.

What is claimed is:

1. A method of developing a reduced order model (ROM) for a model based controller, comprising:

obtaining a design of a rapid thermal processing (RTP) tool, the RTP tool comprising a plurality of heater zones at a lid of a chamber, and a reflector plate over a bottom of the chamber;

building a detailed model of the thermal network of the RTP tool from the design of the RTP tool;

obtaining a training input recipe;

running the detailed model using the training input recipe;

generating a plurality of snapshots, wherein each snapshot includes the temperatures of a plurality of components in the detailed model;

utilizing a dynamic mode decomposition with control (DMDc) operation in order to extract the ROM from the plurality of snapshots;

using the ROM in a recipe to set a temperature for each zone of the plurality of heater zones and to set a temperature for the reflector plate; and processing a substrate between the plurality of heater zones and the reflector using the recipe.

2. The method of claim 1, further comprising:

calibrating the detailed model with available experimental data.

3. The method of claim 1, wherein the DMDc operation includes a non-linear component.

4. The method of claim 1, wherein the ROM is in the format of $\dot{x}=Ax+Bu$, wherein A and B are matrices.

5. The method of claim 1, wherein the ROM is an approximation of the actual governing equations of thermodynamics for the RTP tool.

6. The method of claim 1, wherein an error between an output of the ROM and an output of the detailed model is within 10%.

7. The method of claim 1, wherein the design of the RTP tool is a computer aided design (CAD) file.

8. The method of claim 3, wherein the ROM is in the format of $\dot{x}=Ax^4+Bx+c+Du$, wherein A, B, and D are matrices.

9. A processing tool, comprising:

a chamber;

a plurality of heater zones at a lid of the chamber;

a reflector along a bottom of the chamber;

a substrate support between the plurality of lamps and the reflector; and a controller coupled to the chamber for controlling a temperature of the substrate, wherein the controller is a model based controller that utilizes a reduced order model (ROM) generated with a dynamic mode decomposition with control (DMDc) process, wherein the controller uses the ROM in a recipe to set a temperature for each zone of the plurality of heater zones and to set a temperature for the reflector plate, and wherein the controller is configured to process a substrate on the substrate support between the plurality of heater zones and the reflector using the recipe.

10. The processing tool of claim 9, wherein the processing tool is a rapid thermal processing (RTP) tool.

11. The processing tool of claim 9, wherein the ROM is in the format of $\dot{x}=Ax+Bu$, wherein A and B are matrices.

12. The processing tool of claim 9, wherein the ROM is in the format of $\dot{x}=Ax^4+Bx+c+Du$, wherein A, B, and D are matrices.

13. The processing tool of claim 9, wherein the ROM is generated from a plurality of snapshots.

14. The processing tool of claim 9, wherein the ROM is an approximation of the actual governing equations of thermodynamics for the processing tool.

15. The processing tool of claim 13, wherein the ROM is generated before the processing tool is assembled.

16. A method of developing a reduced order model (ROM) for a model based controller, comprising:

generating a plurality of snapshots, wherein each snapshot includes the temperatures of a plurality of components in a processing tool, the processing tool comprising a plurality of heater zones at a lid of a chamber, and a reflector plate over a bottom of the chamber;

utilizing a dynamic mode decomposition with control (DMDc) operation in order to extract the ROM from the plurality of snapshots;

using the ROM in a recipe to set a temperature for each zone of the plurality of heater zones and to set a temperature for the reflector plate; and processing a substrate between the plurality of heater zones and the reflector using the recipe.

17. The method of claim 16, wherein generating the plurality of snapshots comprises:

obtaining a computer aided design of a rapid thermal processing (RTP) tool;

building a detailed model of the thermal network of the RTP tool from the computer aided design of the RTP tool;

obtaining a training input recipe; and running the detailed model using the training input recipe.

18. The method of claim 16, wherein generating the plurality of snapshots comprises:

running a training recipe on a processing tool; and recording temperatures of a plurality of components at a plurality of times.

* * * * *